United States Patent [19]
Daugherty, Jr. et al.

[11] Patent Number: 6,062,653
[45] Date of Patent: May 16, 2000

[54] BRAKE VALVE SYSTEM FOR DEDICATED FREIGHT CARS

[75] Inventors: David W. Daugherty, Jr., Plainfield, Ill.; Michael L. Ring, Crown Point, Ind.; Harry E. Weber, Brownsville, Pa.

[73] Assignee: Westinghouse Air Brake Company, Wilmerding, Pa.

[21] Appl. No.: 09/059,235

[22] Filed: Apr. 13, 1998

[51] Int. Cl.[7] .................................................. B60T 13/00
[52] U.S. Cl. ..................................... 303/7; 303/15
[58] Field of Search ............................ 303/3, 7, 8, 15, 303/22.6, 22.7, 78, 81, 84.2, 86

[56] References Cited

U.S. PATENT DOCUMENTS

| | | | |
|---|---|---|---|
| 5,335,974 | 8/1994 | Klink | 303/7 |
| 5,785,392 | 7/1998 | Hart | 303/7 |
| 5,924,774 | 7/1999 | Cook et al. | 303/3 |
| 5,927,327 | 7/1999 | Bezos et al. | 303/3 |
| 5,927,822 | 7/1999 | Hart | 303/7 |

*Primary Examiner*—Chris Schwartz
*Attorney, Agent, or Firm*—James Ray & Associates

[57] ABSTRACT

A brake valve system for a pair of railroad freight cars mechanically connected together in a substantially semi-permanent manner. Each of such pair of freight cars has a brake pipe pneumatically connected together. The brake valve system comprises a brake control valve disposed on a first one of such pair of cars and is pneumatically connected to the brake pipe and to a reservoir disposed on the first one of the pair for applying and releasing brakes disposed on both of the pair of freight cars. A vent valve is disposed on a second one of the freight cars and is pneumatically connected to the brake pipe disposed on the second one of the pair of cars for emergency venting of air from the brake pipes of the pair of cars for emergency application of the brakes of the pair of cars.

9 Claims, 2 Drawing Sheets

ID6,062,653

BRAKE VALVE SYSTEM FOR DEDICATED FREIGHT CARS

FIELD OF INVENTION

The present invention relates, in general, to a pair of railway freight cars that are generally permanently mechanically connected together for a dedicated type use and, more particularly, this invention relates to a brake valve system wherein a brake control valve located on a first one of the pair of such freight cars is used to both apply and release the brakes on each of such pair of freight cars.

In the railroad industry, a single dedicated car is usually referred to as a unit. A two or four car unit is referred to as "a car", as in FIG. 2 of the drawings in the present application. In the following description, however, the terms "car and cars" are used in terms understood by the layman.

BACKGROUND OF THE INVENTION

Railroad freight cars that are used repeatedly for a specific purpose are usually connected together, in a generally permanent fashion, by a solid drawbar assembly. Use of this type connection will, however, still enable such freight cars to be separated when needed, such as when a car requires removal from service because of needed repairs. Therefore, a somewhat more appropriate term for the type of mechanical connection effected by this drawbar assembly is "semi-permanent" or "substantially semi-permanent".

Each of these freight cars, in addition, is equipped with a brake pipe and brake cylinders that operate the brakes of each of the freight cars. In this air brake arrangement, the brake pipes are normally serially connected together between the freight cars by a gladhand connected to a flexible hose. Further, the brake pipe will supply the pressurized air that is required by the brake control system of the train to charge the reservoirs which are located on the respective cars for the general operation of the air brake equipment disposed on each freight car.

The air brake equipment on each freight car includes an auxiliary air reservoir, an emergency air reservoir and a conventional pneumatic brake control valve such as the ABDX, ABDW or similar types of control valves. These ABDX and ABDW type brake control valves are manufactured by the Westinghouse Air Brake Company (WABCO) and are quite well known in the railway brake control art.

The typical brake control valve on a railway freight car will at least include both a service portion and an emergency portion, these particular portions being located on radially opposed sides of a pipe bracket. The pipe bracket features a number of internal passageways and ports. As is well known in the art, each port in the pipe bracket connects to one of the branch pipes positioned on the freight such as those leading to the brake pipe, the brake cylinders, and the emergency and auxiliary reservoirs. It is through these ports and internal passageways of the pipe bracket that the relevant portions of the brake control valve communicate pneumatically with piping on a railway freight car.

Both the service and emergency portions of the pneumatic brake control valve operate according to principals which are well known in the railroad industry. The service portion of the brake control valve performs several functions including: (1) controlling the flow of air from the auxiliary reservoir to the brake cylinders for making a service brake application, (2) controlling the recharging of such auxiliary and emergency reservoirs from the main reservoirs located on the locomotive and which are pneumatically connected to the freight cars, (3) controlling the exhausting of air from the brake cylinders when the brakes are released and (4) reinforcing the brake application and release signals being pneumatically conveyed by the brake pipe.

The emergency portion of the brake control valve controls, among other things, (1) the recognition of the emergency brake application signal pneumatically conveyed by the brake pipe and (2) the flow of air from both the auxiliary and emergency reservoirs to the brake cylinders during an emergency brake application. The emergency portion of the control valve on each freight car also serves to propagate the emergency application signal along the train consist by rapidly venting brake pipe pressure to atmosphere.

SUMMARY OF THE INVENTION

The present invention is predicated on the discovery that it is possible to utilize a single brake control valve disposed on one car of a pair of dedicated type freight cars which are normally semi-permanently connected together and one reservoir having a predetermined capacity for air pressure to operate the brakes on both freight cars. The brake system of the invention includes, in addition to the single brake control valve, a vent valve disposed on the other one of such pair of freight cars. The brake control valve disposed on the first one of such pair of freight cars is pneumatically connected to the brake pipe and to the reservoir disposed on such first one of such pair of freight cars for applying and releasing the brakes disposed on both of such pair of freight cars. The vent valve disposed on the second one of such pair of freight cars is also pneumatically connected to the brake pipe disposed on such second one of such pair of freight cars for emergency venting of air from such brake pipes of such pair of freight cars for emergency application of such brakes of such pair of freight cars.

OBJECTS OF THE INVENTION

It is, therefore, one of the primary objects of the present invention to semi-permanently connect two dedicated service type freight cars together and utilize only one brake control valve and reservoir to apply and release the brakes on both freight cars. If more than one pair of freight cars are connected together in such dedicated service, each pair of such freight cars will have one brake control valve, one vent valve and reservoir for controlling the brakes of each pair of the dedicated service type freight cars.

Another object of the present invention is to provide a brake system in which significant weight savings on dedicated service type railroad freight cars, and cost savings in using one brake control valve, one vent valve and one reservoir to operate the brakes on two such dedicated service type freight cars which, in addition, provides further savings in that there is less equipment to be maintained.

In addition to the above described objects and advantages of the present invention, various other objects and advantages of the invention will become much more readily apparent to those persons who are skilled in the relevant railway braking art from the following more detailed description, particularly, when such description is taken in conjunction with the attached drawing Figures and with the appended claims.

BRIEF DESCRIPTION OF A PRESENTLY PREFERRED EMBODIMENT OF THE PRESENT INVENTION

Figure 1:
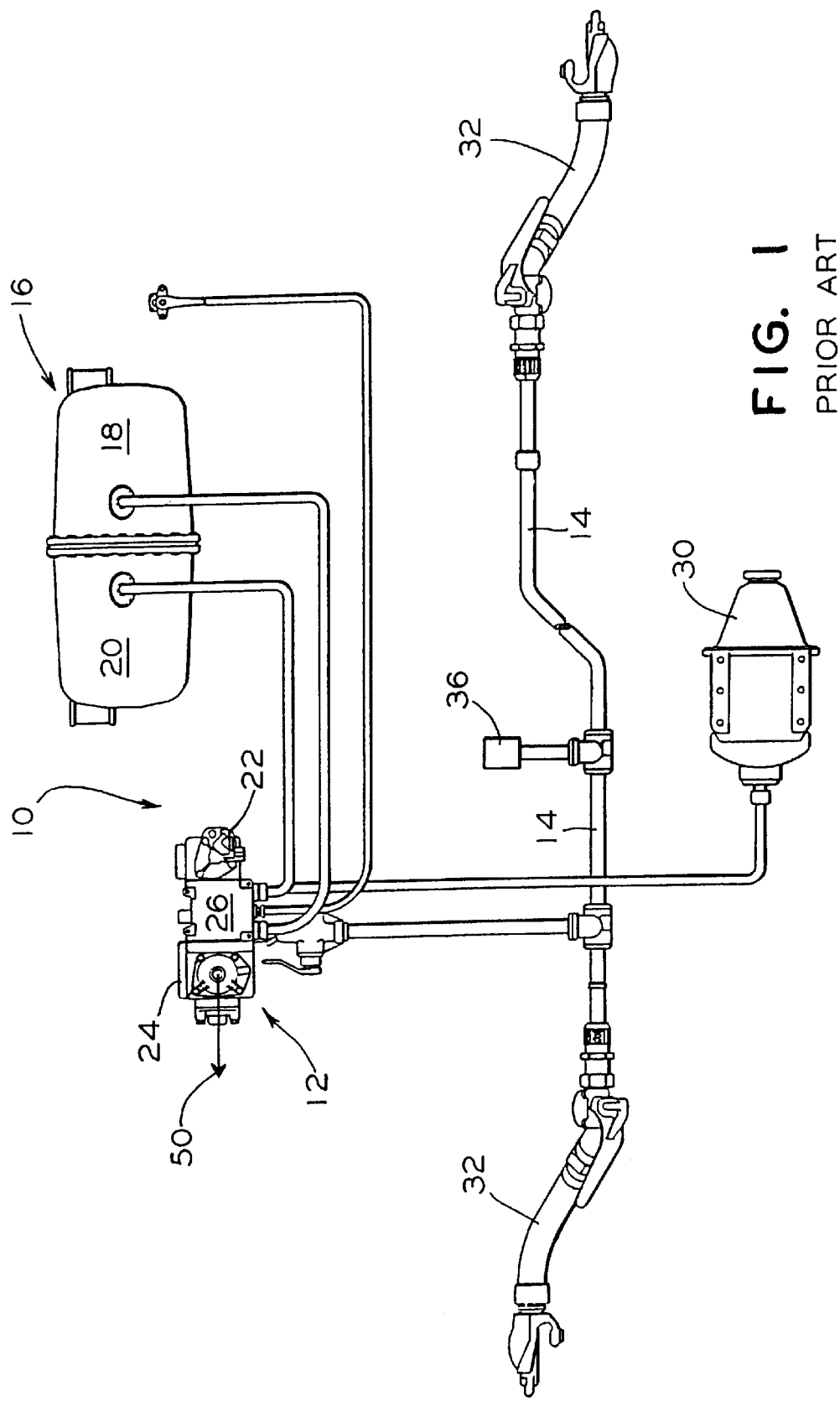
FIG. 1 shows in some detail a prior air brake control system for a freight car using a ABDX brake control valve.

Refer now, more particularly, to FIG. 1 of the drawings. Illustrated therein is a typical prior art type brake system, generally designated 10, for a single railway type freight car (not otherwise shown in FIG. 1) in which a brake control valve, generally designated 12, is shown pneumatically interconnected between a brake pipe 14 of the car and a reservoir, generally designated 16, of compressed air located on the car.

As is clearly shown, reservoir 16 is comprised of two tanks, one is an auxiliary tank 18 and the other is an emergency tank 20. Such auxiliary tank 18 and emergency tank 20 are preferably joined together as the single reservoir 16 unit.

The brake control valve 12, depicted in FIG. 1, has both a service brake portion 22 and an emergency brake portion 24 mounted respectively on opposed sides of a pipe bracket 26 in a well known manner and pneumatically connected to the appropriate respective tanks of reservoir 16 also in a well known manner.

The pipe bracket 26 is connected to supply air pressure to brake cylinders 30 located on the railway freight cars, only one of which is shown in FIG. 1, while flexible hose couplers 32 are connected to opposed ends of brake pipe 14 and are employed to serially connect such brake pipe 14 to the brake pipes (all of which are shown schematically in FIG. 2) of adjacently disposed freight cars 40 and 41 that will be mechanically connected to the brake pipe 14 disposed on the freight car under discussion.

Figure 2:
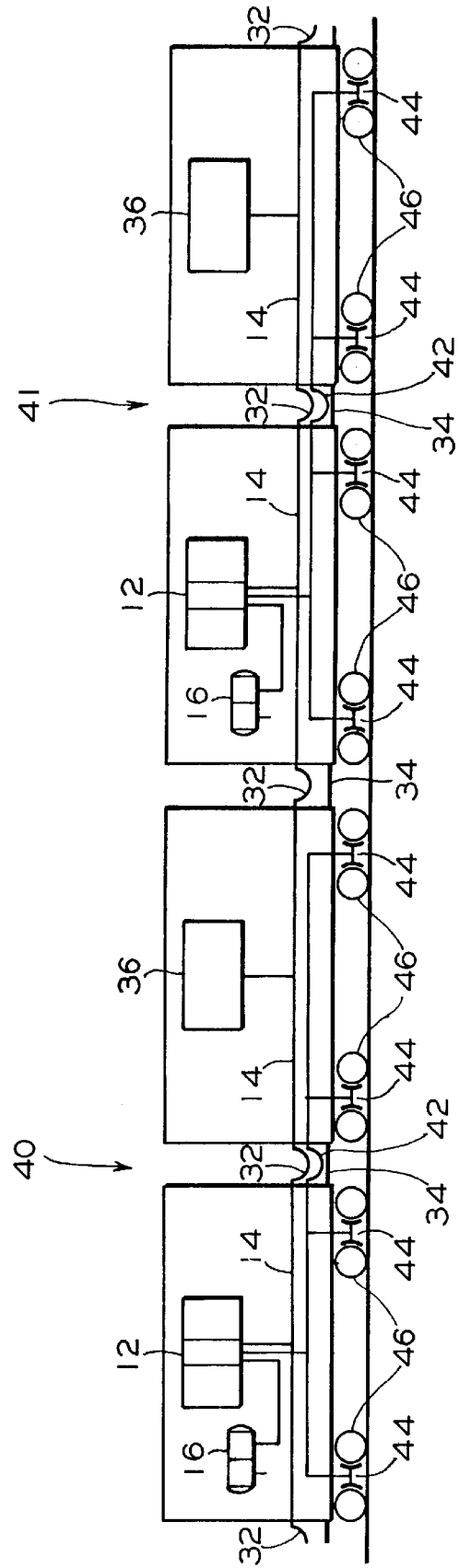
FIG. 2 is a diagrammatic representation of four dedicated service type freight cars semi-permanently connected together by solid drawbars and two cars of a pair pneumatically connected for operation of brakes on both cars by one brake control valve located on one of the cars.

According to the present invention, there is at least one pair of freight cars that are mechanically connected together by a solid drawbar assembly 34, diagrammatically illustrated in FIG. 2 of the drawings by a straight horizontal bar extending between such freight cars.

An emergency vent valve 36 is shown in FIG. 1 connected to the brake pipe 14. Such vent valve 36 is designed to function during an emergency reduction of brake pipe pressure to locally exhaust brake pipe pressure to atmosphere and to further assist in transmitting the emergency rate of pressure reduction throughout the train consist.

FIG. 2 of the drawings diagrammatically illustrates two pairs of freight cars 40 and 41 which have been semi-permanently connected together mechanically by drawbar assemblies 34 and that are pneumatically connected together by hose couplers 32 serially connecting the brake pipes 14 of the two pairs of freight cars 40 and 41. The brake pipes are located beneath the car bodies but for the schematic purposes of FIG. 2, pipes 14 and couplers 32 are shown located in an upper portion of the cars.

In the instant brake system, each car of a pair of freight cars 40 or 41 must also be pneumatically connected together by a second flexible hose 42 for the purpose of having one brake control valve 12 disposed on a first one of the pair of freight cars 40 or 41 to both apply and release the brakes 44 on both of the freight cars 40 or 41 of the pair. In FIG. 2, two pairs of such freight cars 40 and 41 are shown mechanically connected together, though the number of pairs of dedicated freight cars can be any number of freight car pairs and still be within the scope of the present invention.

In FIG. 2, four brake shoes 44 are diagrammatically depicted to represent the brakes on each freight car of pairs 40 and 41. The brake shoes 44 are applied to and released from the wheels 46 of the freight cars 40 and 41, as depicted in FIG. 2, by appropriately located brake cylinders 30 (FIG. 1).

In FIG. 2, the brake cylinders are not shown, as this Figure is a simple schematic, but these brake cylinders are disposed on the freight cars 40 and 41 in a well known manner. The brake cylinder 30, illustrated in FIG. 1, is a well known body-mounted brake cylinder, although truck mounted brake cylinders located beneath the freight cars 40 and 41 can be used equally as well as is well known in the railway brake art.

As can be seen in FIG. 2, each brake control valve 12 is pneumatically connected to control the application and release of the brake shoes 44 of both freight cars of a pair of freight cars via appropriate piping associated with each car, with flexible hoses 42 pneumatically connecting the brakes 44 of a pair of dedicated freight cars.

When a pneumatic service brake signal is received over the brake pipes 14 of the freight cars to apply train brakes, such brake control valve 12 on the first one car of the pair operates to apply the brakes 44 on both freight cars of the pair using the brake cylinders 30 located on the cars and auxiliary air tank 18 located on the car containing brake control valve 12.

Similarly, when a pneumatic release signal is sent over the train line and received by the brake control valve 12, the brake control valve 12 orders the release of such brakes 44 on both freight cars.

As shown in FIG. 2 of the drawings, a second car of each pair of cars 40 and 41 is provided with a vent valve 36 that is connected to the brake pipe 14 for rapidly exhausting the brake pipe 14 pressure to atmosphere in an emergency braking situation. In an emergency, brake control valve 12 supplies both the auxiliary and emergency reservoir pressure to the brake cylinders 30 on both freight cars substantially simultaneously from reservoir tanks 18 and 20.

The brake control valve 12 also has an emergency vent port, indicated in FIG. 1 by an arrow 50, for rapidly exhausting the brake pipe 14 pressure to atmosphere in a manner similar to that of such vent valve 36. The AAR currently requires a brake control valve 12 for every 125 feet of brake pipe 14 length and an emergency type vent valve 36 for every 75 feet of brake pipe 14 length.

Brake pipe 14 length corresponds generally to that of car lengths. If one pair of freight cars 40 or 41 is about 100 feet, the emergency part of the one brake control valve 12 meets the 125 foot requirement and the combination of vent valve 36 and the emergency vent port 50 of the brake control valve 12 meets the 75 foot requirement.

Since one reservoir 16 and one brake control valve 12 are used to operate the brakes 44 on two freight cars, the auxiliary and emergency reservoir tanks 18 and 20 and the brake control valve 12 have to be of a size which is at least sufficient to provide the volume of pressurized air needed to operate the brakes 44 on two freight cars simultaneously. This requires an enlargement of the auxiliary and emergency reservoir tanks 18 and 20 presently being used on freight cars and an enlargement of presently used brake control valves 12 and valve ports and passageways to insure proper brake operation.

While a presently preferred embodiment for carrying out the instant invention has been set forth in detail above, those persons skilled in the air brake valve art to which this invention pertains will recognize various alternative ways of practicing the invention without departing from the spirit and scope of the claims appended hereto.

We claim:

1. A brake valve system for a pair of dedicated railroad freight cars mechanically connected together in a substantially semi-permanent manner and each of such pair of freight cars having a brake pipe pneumatically connected together, said brake valve system comprising:

- a brake control valve disposed on a first one of the pair of freight cars and pneumatically connected to the brake pipe and to a reservoir disposed on one of the first one and a second one of the pair of freight cars for applying and releasing brakes disposed on both of the freight cars, and
- a vent valve disposed on the second one of the pair of freight cars and pneumatically connected to the brake pipe disposed on the second one of the freight cars for emergency venting of air from the brake pipes of the pair of freight cars for emergency application of the brakes of the pair of freight cars.

2. The brake valve system, according to claim 1, wherein said control valve has an emergency portion for venting air to atmosphere for emergency application of the brakes of such pair of freight cars.

3. The brake valve system, according to claim 1, wherein the reservoir includes both an auxiliary and an emergency reservoir sized to provide a volume of pressurized air sufficient to operate the brakes of the pair of freight cars.

4. The brake valve system, according to claim 3, wherein said control valve is sized to provide a volume of pressurized air flow from at least one of said auxiliary and said emergency reservoir during a service brake application and from both of said reservoirs sufficient to operate the brakes of the pair of freight cars during an emergency application.

5. The brake valve system, according to claim 1, wherein such brake pipes of respective freight cars of the pair of freight cars are pneumatically connected together by a flexible hose connection extending between the respective freight cars, and

- a second flexible hose connection extending between the freight cars pneumatically connecting brakes of the respective cars together for control of said brakes by said brake control valve located on the first of such pair of freight cars.

6. The brake valve system, according to claim 1, wherein the pair of freight cars are semi-permanently connected by a solid drawbar assembly extending between the pair of freight cars.

7. The brake valve system, according to claim 1, wherein the brakes on the pair of freight cars are applied and released by brake cylinders located on the individual freight cars and pneumatically connected to said brake control valve located on the first one of the freight cars.

8. The brake valve system, according to claim 7, wherein the brake cylinders are mounted on a body portion of each freight car.

9. The brake valve system, according to claim 7, wherein the brake cylinders are mounted on truck portions of each of the freight cars.

* * * * *